May 26, 1925.
E. ROBERTSON ET AL
1,539,697
METHOD OF AND APPARATUS FOR COATING CINEMATOGRAPH AND OTHER FILMS
Filed Jan. 5, 1923
3 Sheets-Sheet 1
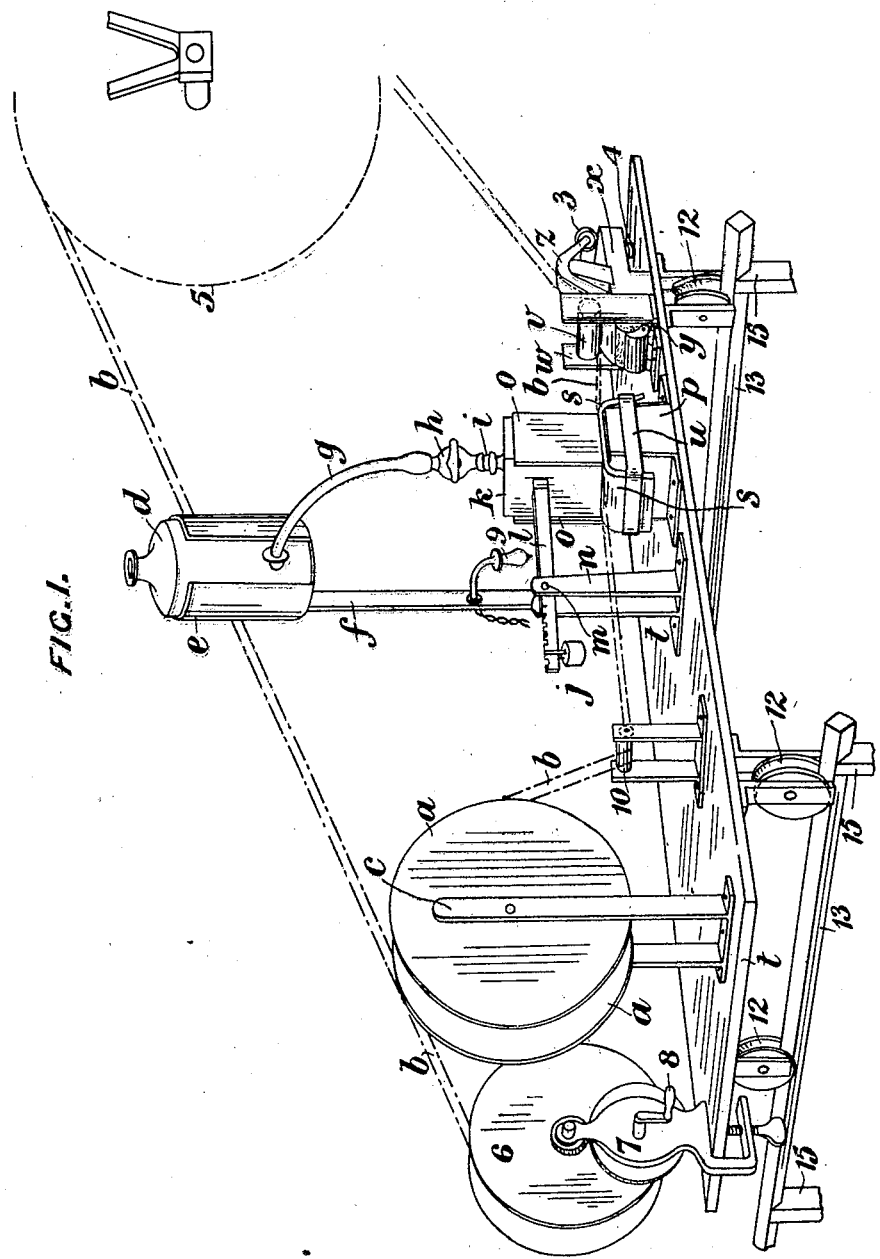
Inventor.
Edward Robertson
Lionel Munro Wyllie
By F.C. Somes, Attorney

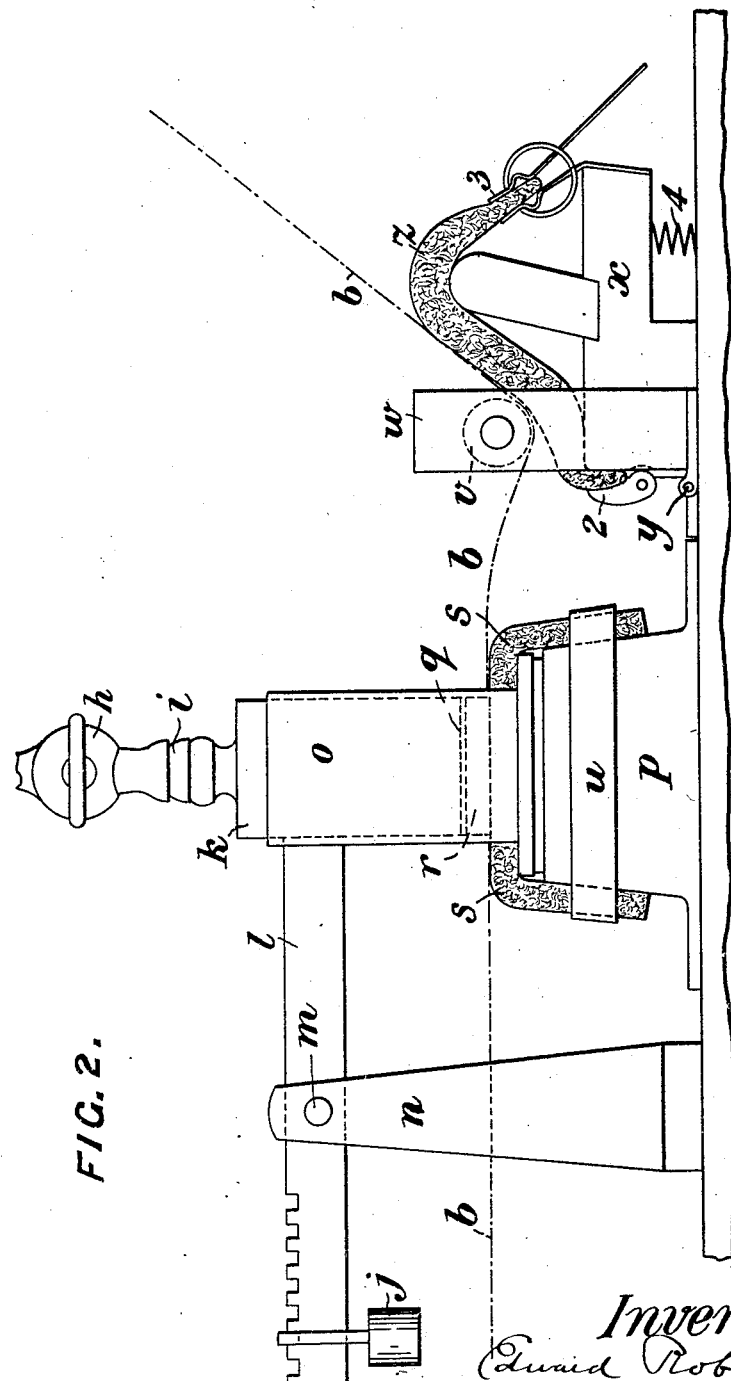

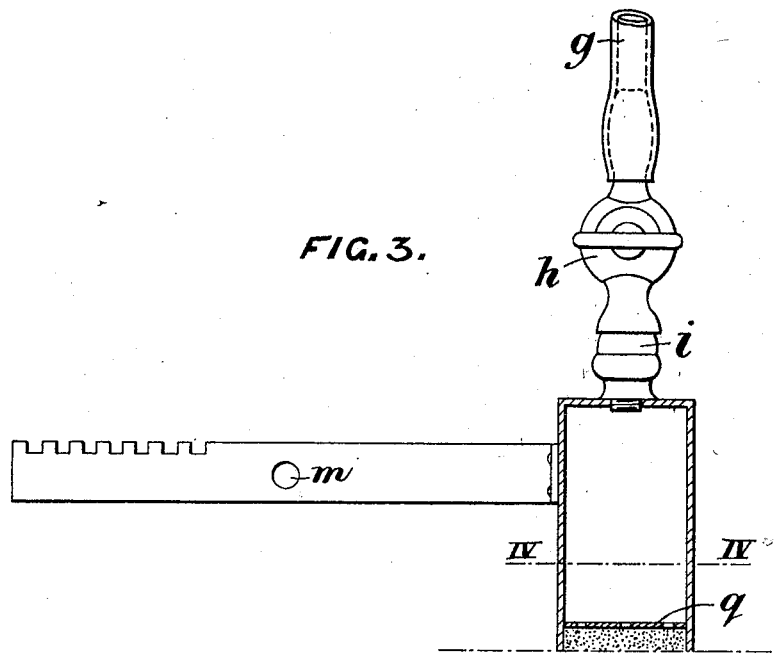
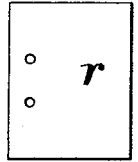
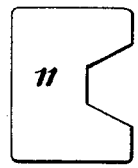
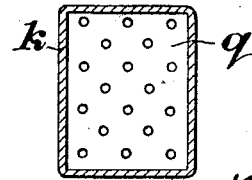
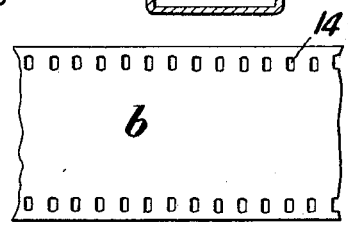

Patented May 26, 1925.

1,539,697

UNITED STATES PATENT OFFICE.

EDWARD ROBERTSON, OF MARYLEBONE, LONDON, AND LIONEL M. WYLLIE, OF ST. PANCRAS, LONDON, ENGLAND.

METHOD OF AND APPARATUS FOR COATING CINEMATOGRAPH AND OTHER FILMS.

Application filed January 5, 1923. Serial No. 610,936.

*To all whom it may concern:*

Be it known that we, EDWARD ROBERTSON, a British subject, of No. 10 Upper Charlton Street, Fitzroy Square, Marylebone, London, W. 1, England, and LIONEL MUNRO WYLLIE, a British subject, of Hampden Club, Phoenix Street, St. Pancras, London, N. W. 1, England, do hereby declare the nature of this invention to be as follows—Method of and Apparatus for Coating Cinematograph and Other Films.

This invention relates to an improved method of and apparatus for coating cinematographic films and other films provided with holes or perforations, adapted, for instance, to engage the sprockets or sprocket wheels or drums for the purpose of feeding and maintaining the proper feed and register of such films.

In order to clean and to fill up scratches, it has heretofore been the practice to coat the film-side of cinematographic films with a transparent solution after they have been in use for some time. The coating was applied between the perforations, only, because it was found that if the coating were spread over the entire surface, the sprocket holes became clogged and drops or ridges of the coating material remained at the edges of the holes, thereby preventing the smooth and uniform and frictionless travel of the film when used again in a projector. The pad or pads, hitherto used in connection with the coating process have been of a width equal to that of the central or picture portion and have not been such as to suck up or absorb solution or coating material passing through or deposited in the neighbourhood of the sprocket holes. Moreover, a film which is only coated in the middle is weaker at the edges than elsewhere and is more liable to damage than if uniformly coated over its whole surface. While the invention is primarily intended for coating the film-side with a solution or transparent coating, after the film has been used for some time, it is very advantageous to coat the film-side with a protective coating before the film is used, thereby rendering the surface smooth or as if polished and, consequently, increasing the life and strenght of the film. It is, moreover, also advisable to coat the back or celluloid side of the film in order to fill up scratches after the film has been cleaned.

According to this invention, the film is coated with a transparent solution which is distributed over the whole width or surface of the film and the perforations or holes are kept unclogged or clear of the coating material by causing the film to pass over, and in intimate contact with, an absorbent pad or pads, suitably as wide as or wider than the film. This pad is made of exceptionally absorbent material, such as soft wool, and not only absorbs the surplus coating material or solution passing through the holes but, owing to its frictional contact with the film, also prevents the accumulation of solution in the neighbourhood of the holes and keeps the underside or back of the film dry. This absorbent pad is, conveniently, adjustably mounted on a block and, preferably, the film is elastically pressed against the pad or the pad is elastically pressed against the film. The other side of the film is in contact with a distributing pad or pads, as wide as or wider than the film, conveniently made of soft wool, felt or other appropriate material and mounted under the bottom of a container or distributer, which bottom is perforated to allow the solution to soak through the upper and distributing pad and on to the film. The distributer, conveniently, consists of a suitably guided vessel, the perforated bottom of which is near the lower end thereof and it is adapted to contain the distributing pad in the recess below the said perforated bottom. Preferably, the distributer is mounted on a lever and between two vertical guides to centralize it in relation to, and to cause it to press elastically on, the film. The distributer is, moreover, conveniently connected by a flexible or pointed pipe-connection to an independently mounted reservoir for containing the coating material, so that the pressure on the film may be uniform, whether the reservoir be full or nearly empty. After the film has passed out between the distributing and absorbent pads, the solution or coating material is spread uniformly over the whole width of the film by passing under a fixed or revoluble spreader, distributing roller or member, which is suitably made of glass, and the film is pressed elastically against the spreader by a second absorbent pad or pads, also suitably made of thick soft wool, felt or other appropriate material as wide as or wider than the film. The second absorbent pad is, conveniently, adjustably mounted on a block, furnished with a spring and serves to take up any moisture which may have penetrated the sprocket holes in the film, and the under side or back of the latter leaves the pad in a practically or nearly dry condition, so that the coating can be finally dried and hardened in any convenient manner, such as by winding it on a drum.

And in order that the invention may be readily understood reference will be made to the accompanying drawings, illustrating one suitable construction of apparatus according to this invention, and in which—

Figure 1 is a perspective and more or less, diagrammatic view

Figure 2 is an elevation, to an enlarged scale, of the principal parts of the apparatus.

Figure 3 is a part sectional elevation of the distributing device.

Figure 4 is a plan section on the line IV—IV Figure 3.

Figure 5 is a plan of the distributing pad for coating the film side of the film.

Figure 6 is a plan of a pad for use when coating the celluloid or back side of the film for cleaning and filling up the scratches thereon and Figure 7 is a plan view of part of a cinematograph film.

As shown in Figure 1, the apparatus comprises a spool $a$ for holding the film, indicated by the dotted line $b$, a support $c$ fixed to a bed or table $t$ for revolubly holding the spool $a$, a bottle or reservoir $d$ for containing the coating solution, a stand, cage or bracket $e$, mounted on a pillar $f$ for supporting the reservoir, a rubber discharge pipe $g$ (see also Figure 3), a cock or valve $h$ (Figures 1, 2 and 3), and means such as an adapter or union $i$ for connecting the latter to a container or distributer $k$. The distributer $k$ consists of a rectangular receptacle mounted on a lever $l$, pivoted at $m$ on a forked support $n$ fixed to the table $t$ and guided vertically between two guides $o$, fixed to a supporting block or base $p$ which is secured to the bed or table $t$. The distance between the guides $o$ is rather greater than the width of the film $b$. If desired, the lever $l$ may be furnished with a counterweight $j$, but it is not essential. The distributer $k$ is provided with a recessed perforated bottom $q$ (as seen in Figures 3 and 4) and the recess below the bottom is adapted to contain a distributing felt pad $r$ which may, as shown in Figure 5, be furnished with two holes, or it may have more than two holes. This pad $r$ is adapted for coating the emulsion or film side of the film and a lower pad $s$, made of felt, soft wool or other absorbent material is, conveniently, secured to the supporting block or base $p$ by an india rubber band $u$, as shown in Figures 1 and 2. After the film has passed out between the distributing pad $r$ and absorbent pad $s$, it is conducted under a cylindrical or curved and polished spreader $v$ made of glass or other appropriate material and mounted on two vertical supports $w$. Between these supports is hinged a block $x$ at $y$ and this block is adapted to hold a second absorbent pad $z$ which is secured to the block by two spring-clips, marked 2 and 3, respectively. The block $x$ is constantly and elastically pressed towards the spreader $v$ by the coiled spring 4, the film $b$, after passing between the spreader $v$ and the second absorbent pad $z$ is, as shown in Figure 1, wound on to a drum 5, rotatable in bearings mounted on supports, for being dried and is finally conducted to a re-winder 6, mounted on a bracket 7 which is, conveniently, clamped to the bed or table $t$ and furnished with a crank handle 8. The pillar $f$ may support an electric lamp 9 as well as the cage or support $e$ for the reservoir $d$. Suitable guides or guide rollers, such as marked 10, are provided in the path of the film wherever required.

If the back or celluloid-side of the film is to be coated, the distributing pad 11 (Figure 6) may be employed instead of the pad $r$ and this pad 11 is provided with a V-shaped slot or cut-out part at one end, as shown.

The bed or table is, conveniently, mounted on suitably supported guides so as to be capable of moving along from one end to the other of a drying drum and, for this purpose, it may be provided with brackets in which are mounted grooved or flanged wheels or rollers 12 which run on rails 13, suitably supported on stanchions 15, as shown, or otherwise.

By this invention, the whole width of the film $b$ Figure 7 is coated uniformly and the edges of the same, in the neighbourhood of the sprocket holes 14 are strengthened without any filling up or clogging of the holes and also without the formation of ridges near the holes.

What we claim as our invention, and desire to secure by Letters Patent, is:—

1. The method of coating cinematographic films in which the whole surface of the film including the perforated edges, is coated with a coating liquid adapted when dry to permanently coat and strengthen the film and the perforations are kept clear of the coating material by causing one side of the film to pass under a distributing pad saturated with the said coating liquid while the other side of the film is in intimate contact with an absorbent pad approximately as wide as the film, the said film being elastically pressed between the pads so that any coating material passing through the perforations is absorbed, the holes remaining unclogged and the underside or back of the film is wiped and kept free from any ridges or drops of coating material.

2. Apparatus for coating cinematographic and other films comprising a reservoir for the coating liquid, a distributer adapted to coat the whole width of the film, a pipe connection between the reservoir and the distributer, an absorbent pad mounted below the film to receive the coating material, the said pad being approximately as wide as the film and adapted to receive such coating material as passes through the perforations and beyond the edges of the film, means for supporting the said pad, means for causing the film to be elastically pressed between the distributer and the pad, a spreading device to render the coating on the film uniform, means for supporting said spreading device, an absorbent pad below the said spreading device and means for elastically pressing the film between the said spreading device and said pad, substantially as set forth.

3. Apparatus for coating cinematographic and other films comprising a reservoir for the coating liquid, a distributer connected to the said reservoir, means for vertically guiding the said distributer, an absorbent pad, as wide as the film to be coated at the bottom of said distributer and through which the liquid is adapted to percolate on to the film, a second absorbent pad mounted below the film to receive such coating material and passes through the perforations and beyond the edges of the film, means for supporting said second pad, a spreading device to render the coating on the film uniform, means for supporting said spreading device, a third absorbent pad below said spreading device and means for elastically supporting said third absorbent pad, substantially as set forth.

4. Apparatus for coating cinematographic and other films comprising a reservoir for the coating liquid, a distributer provided with a recessed perforated bottom, the said distributer pivotally mounted on a support, vertical guides for the said distributer, and absorbent pad, approximately as wide as the film to be coated and mounted in the recess at the bottom of the distributer and through which pad the coating liquid is adapted to percolate on to the film, a second absorbent pad mounted below the film to receive such coating material as passes through the perforations and beyond the edges of the film, means for supporting said second pad, a spreading device to render the coating on the film uniform, means for supporting said spreading device, a third absorbent pad below said spreading device and means for elastically supporting said third absorbent pad, substantially as set forth.

5. Apparatus for coating cinematographic films comprising a reservoir for the coating liquid, a distributor provided with a recessed perforated bottom, the said distributer pivotally mounted on a support, vertical guides for the said distributer, an absorbent pad, approximately as wide as the film to be coated and mounted in the recess at the bottom of the distributer and through which pad the coating liquid is adapted to percolate on to the film, a second absorbent pad to receive such coating material as passes through the perforations and beyond the edges of the film, the said pad mounted below the film on a block, means for securing the second absorbent pad to the said block, a spreading device to render the coating on the film uniform, means for supporting said spreading device, a third absorbent pad below said spreading device and means for elastically supporting said third absorbent pad, substantially as set forth.

6. Apparatus for coating cinematographic and other films comprising a reservoir for the coating liquid, a pivotally mounted distributer, means for supporting the pivot of the said distributer, a block, vertical guides mounted on the said block for the said distributer, a recessed perforated bottom for the distributer, and absorbent pad, approximately as wide as the film to be coated and mounted in the recess at the bottom of the distributer and through which pad the coating liquid is adapted to percolate on to the film, a second absorbent pad, mounted on the said block below the film and adapted to receive such coating material as passes through the perforations and beyond the edges of the film, means for securing the said second pad to the said block, a spreading device having a curved surface to render the coating on the film uniform, means for supporting the said spreading device, a third absorbent pad mounted below said spreading device and means for elastically supporting said third absorbent pad, substantially as set forth.

7. Apparatus for coating cinematographic and other films comprising a reservoir for the coating liquid, a pivotally mounted distributer, means for supporting the pivot of the said distributer, a block, vertical guides mounted on the said block for the said distributer, a recessed perforated bottom for the distributer, an absorbent pad, approximately as wide as the film to be coated and mounted in the recess at the bottom of the distributer and through which pad the coating liquid is adapted to percolate on to the film, a second absorbent pad, mounted on the said block below the film and adapted to receive such coating material as passes through the perforations and beyond the edges of the film, means for securing the said second pad to the said block, a spreading device having a curved surface to render the coating of the film uniform, supports for the said spreading device, a block pivotally mounted between the said supports, a spring adapted to press the said block towards the spreading device, a third absorbent pad and means for securing the said pad to the pivotally mounted block, substantially as set forth.

8. Apparatus for coating cinematographic and other films comprising a bed, a spool to receive the film to be coated, a support for the said spool, a reservoir, a support for said reservoir, a pivotally mounted distributer, a flexible pipe connection between the reservoir and the distributer, means for supporting the pivot of said distributer, a block fixed to the bed, vertical guides mounted on the said block for the said distributer, a recessed perforated bottom for the distributer, an absorbent pad approximately as wide as the film to be coated and mounted in the recess at the bottom of the distributer and through which pad the coating liquid is adapted to percolate on to the film, a second absorbent pad, mounted on the said block below the film and adapted to receive such coating material as passes through the perforations and beyond the edges of the film, means for securing the second pad to the said block, a spreading device having a curved surface to render the coating on the film uniform, supports for the said spreading device, a block, pivotally mounted between the said supports, a spring adapted to press the said block towards the spreading device, a third absorbent pad, means for securing the said pad to the pivotally mounted block, a rotatable drying drum, means for supporting the said drum, a re-winder spool and means for supporting the said spool, substantially as set forth.

9. Apparatus for coating cinematographic and other films comprising a bed, brackets on the bed to receive flanged wheels or rollers, rails on which the said wheels are adapted to roll, supports for the said rails, a spool to receive the film to be coated, a support for the said spool, a reservoir, a support for the said reservoir, a pivotally mounted distributer, a flexible pipe connection between the reservoir and the distributer, means for supporting the pivot of said distributer, a block fixed to the bed, vertical guides mounted on the said block for the said distributer, a recessed perforated bottom for the distributer, an absorbent pad approximately as wide as the film to be coated and mounted in the recess at the bottom of the distributer and through which pad the coating liquid is adapted to percolate on to the film, a second absorbent pad, mounted on the said block below the film and adapted to receive such coating material as passes through the perforations and beyond the edges of the film, means for securing the said second pad to the said block, a spreading device having a curved surface to render the coating on the film uniform, supports for the said spreading device, a block, pivotally mounted between the said supports, a spring adapted to press the said block towards the spreading device, a third absorbent pad, means for securing the said pad to the pivotally mounted block, a rotatable drying drum, means for supporting the said drum, a re-winder spool and means for supporting the said spool, substantially as set forth.

In testimony whereof we have signed our names to this specification in the presence of two subscribing witnesses.

E. ROBERTSON.
LIONEL M. WYLLIE.

Witnesses:
A. H. THOMAS,
C. A. JENSEN.